US010915842B2

(12) United States Patent
Schneider

(10) Patent No.: US 10,915,842 B2
(45) Date of Patent: Feb. 9, 2021

(54) SYSTEM AND METHOD FOR DEVELOPING MULTI-OBJECTIVE PRODUCTION PLANS FOR PRODUCTION AGRICULTURE

(71) Applicant: PLANTING PROFITS LLC, Masonville, CO (US)

(72) Inventor: Gary Michael Schneider, Masonville, CO (US)

(73) Assignee: PLANTING PROFITS LLC, Masonville, CO (US)

( * ) Notice: Subject to any disclaimer, the term of this patent is extended or adjusted under 35 U.S.C. 154(b) by 9 days.

(21) Appl. No.: 15/795,553

(22) Filed: Oct. 27, 2017

(65) Prior Publication Data

US 2018/0181894 A1 Jun. 28, 2018

Related U.S. Application Data

(60) Provisional application No. 62/429,354, filed on Dec. 2, 2016.

(51) Int. Cl.
| | |
|---|---|
| *G06Q 10/06* | (2012.01) |
| *G06Q 50/02* | (2012.01) |
| *G06Q 40/04* | (2012.01) |
| *G06Q 30/02* | (2012.01) |

(52) U.S. Cl.
CPC ... *G06Q 10/06313* (2013.01); *G06Q 10/0635* (2013.01); *G06Q 10/06314* (2013.01); *G06Q 30/0202* (2013.01); *G06Q 40/04* (2013.01); *G06Q 50/02* (2013.01)

(58) Field of Classification Search
None
See application file for complete search history.

(56) References Cited

U.S. PATENT DOCUMENTS

| | | | | |
|---|---|---|---|---|
| 6,990,459 | B2 * | 1/2006 | Schneider | A01B 79/00 |
| | | | | 705/7.28 |
| 7,991,754 | B2 * | 8/2011 | Maizel | G06Q 10/0637 |
| | | | | 707/705 |
| 8,335,653 | B2 * | 12/2012 | Pruett | A01B 79/005 |
| | | | | 702/19 |
| 2010/0306012 | A1 * | 12/2010 | Zyskowski | G06Q 10/06 |
| | | | | 705/7.36 |
| 2013/0282423 | A1 * | 10/2013 | Hori | G06Q 50/02 |
| | | | | 705/7.25 |

* cited by examiner

*Primary Examiner* — Daniel Swerdlow
(74) *Attorney, Agent, or Firm* — Schwabe Williamson & Wyatt, PC

(57) ABSTRACT

A system comprised of hardware, software and business processes to more effectively make multi-objective crop production plans, and in particular, single year or multi-year crop selection, acreage allocation, and resource management strategies for production agriculture that can be used by farmers, agricultural professionals who work with farmers and land managers. The method uses mathematical programming and sensitivity analysis to help the user determine optimal allocations of controllable resources such as land, capital, labor, water, machinery, and chemicals and for deploying risk management strategies such as precise combinations of forward sales and hedging, crop insurance and crop diversification, in the context of farm management objectives. The system allows the import of data and information relating to the farm and data and information from third-party industry professionals and other data sources.

35 Claims, 10 Drawing Sheets

SYSTEM AND METHOD FOR DEVELOPING MULTI-OBJECTIVE PRODUCTION PLANS FOR PRODUCTION AGRICULTURE

FIELD OF THE INVENTION

The present invention relates to production planning capabilities to support farm production planning decisions, specifically quantifying the trade-offs between competing objectives such as income, risk, and asset utilization in selecting the optimal mix of crops, acreage, inputs, risk management products, and management strategies. Moreover the present invention includes derivative software as well as the means to deploy said software. The software can be used for developing agricultural production plans that precede planting and to help address the myriad of simultaneous decisions and to support other activities associated with crop production planning.

BACKGROUND OF THE INVENTION

The present invention builds upon U.S. Pat. No. 6,990,459, entitled "SYSTEM AND METHOD FOR DEVELOPING A FARM MANAGEMENT PLAN FOR PRODUCTION AGRICULTURE". A summary of the functional relevance of U.S. Pat. No. 6,990,459 is provided below as reference.

Farmers, in an effort to support their management decision making, increasingly capture, store agronomic, climatic and economic data and other information associated with crop production. Farmers are awash in data but in some cases lack the decision support tools needed to fully capitalize on their data and information investments.

Production planning, (i.e. determining the optimal mix of crops and acreage) involves a multitude of simultaneous decisions and relies on farm data and other information. First, "optimal" refers to what is best for an individual farming operation which can be quite different in terms of competing objectives of profit, risk, asset utilization and stewardship. Simultaneous decisions refers to the dependent decisions involved in assigning a crop to a field as well as the aggregate decision of a set of field and crop level decisions. For example, if a farmer elects to plant two-thirds of his acreage to corn that has implications for fertility management, crop protection, amount of operating capital required, risk management instruments available as well as the impact on future crop rotations. What crop the farmer elects to plant on the remaining one-third or his acreage has similar micro implications. Then taken together the overall strategy is a combination of many interlocking decisions.

U.S. Pat. No. 6,990,459, created a basic production planning optimization capability for determining crop and field assignments. For example, a farmer with eight fields who farms four different crops with some flexibility in rotations, has (mathematically) over 60,000 possible crop/field combinations by crop type. Allowing for required rotations and other restrictions there are still probably over 30,000 possible crop/field combinations. The previous invention addressed risk-based production planning considerations (beyond diversification from crop and field assignments) more rudimentary. U.S. Pat. No. 6,990,459, required the user to be able to integrate and synthesize the cost/benefit of combinations of forward sales, crop insurance and hedging. The previous invention does not provide a comprehensive or coherent framework to develop and evaluate deploying risk management instruments into the overall production planning process. With respect to risk management, use of these instruments in combination with the agronomic and operational aspects of a farming operation represent a myriad of interdependent decisions and an infinite number of possibilities. In summary, U.S. Pat. No. 6,990,459, provided some of basic planning and trade-off capabilities, but it lacked the implicit risk management algorithms and analytical framework to adequately address the complexities of production and market risks faced by many farmers as they attempt to balance profit, risk, conservation practices and asset utilization.

U.S. Pat. No. 6,990,459, employed optimization algorithms, specifically linear and integer programming, combined with a farm-specific and regional knowledge base, to enable users to compare estimated income, risk factors and resource consumption of various crop strategies. For each strategy the effects of resource constraints and variable projections in crop prices and yields are quantified; however, critical sensitivity analysis is performed primarily by the user. Selected parameters can be altered by the user to generate new strategies but this approach has key limitation, among them, relying on the user to drive the sensitivity analysis that the present invention overcomes.

This is one of several fundamental differences between U.S. Pat. No. 6,990,459, and the present invention. The present invention uses enhanced and automated sensitivity analysis processes based on a defined hierarchy of parameterization rules. This enables use of the algorithms to not be constrained by the user's cognitive abilities and the need to manually change controllable variables via a user interface such as crop acreage limits, forward sales quantities, crop insurance choices, working capital requirements.

A second fundamental difference between U.S. Pat. No. 6,990,459, and the present invention, is that the present invention provides an additional set of farm models that enhance risk management decision making capabilities and outcomes. The present invention includes additional minimum income inputs by the user and the ability to systematically and efficiently define, quantify, capture and input (into the optimization model) all relevant combinations of available risk management instruments for each crop under consideration. This enables the algorithms of the present invention to find strategies that meet a minimum income goal while maximizing estimated income.

A third fundamental difference between U.S. Pat. No. 6,990,459, and the present invention, is that the present invention provides additional set of farm models that enhance resource management decision making capabilities and outcomes. The present invention provides an addition set of models that enable the user to minimize use of an input resource while attaining a user defined minimum amount of income. This enables the algorithms of the present invention to find strategies that meet a minimum income goal while minimizing use of an input such as working capital, nutrients, water or any other controllable resource.

These three fundamental enhancements of the present invention work in unison using more advanced mathematical models which provide the user with a greater ability to process the complexity of inter-dependent risk and resource management decisions while automating sensitivity analysis to better utilizes available computing power. These three fundamental enhancements represent material improvements to U.S. Pat. No. 6,990,459.

SUMMARY OF THE INVENTION

The present invention assists farmers and professional advisors working with farmers, to develop optimum custom, seasonal or multi-seasonal cropping strategies. The present invention enables farmers and professional advisors to work simultaneously from different locations to develop a single production planning analysis. The present invention provides farmers with the capability to improve farm income by assisting in, inter alia, crop selections, risk management, and resource management (i.e., the allocation of farm resources such as capital, land, labor, machinery, etc., to a combination of crop enterprises to achieve farm objectives). The present invention links the farmers' intimate knowledge of their farms with principles of agricultural economics, market analysis and operations management. Employing microeconomic and operations research principles to production agriculture, combined with a farm-specific and regional knowledge base, makes the present invention a universal planning tool which can be used anywhere regardless of a farm's geographical location.

Once implemented, users of the present invention can quickly compare estimated income, risk profile, cash flow and resource consumption of competing cropping strategies. For each selected cropping strategy, the effects of resource constraints and projections in crop prices and yields are quantified. Sensitivity analysis is then performed via intrinsic rules—determined internally and/or by the user—to drive to a strategy with an optimal combination of estimated income, certainty in income, and resource utilization. Selected parameters are systematically altered to provide insight as to the most optimum cropping strategy. These parameters include, without limitation, the impact of variances in prices, yields and production cost projections, and the sensitivity of proposed cropping strategies in relation to these uncertainties; the effects of varying or substituting available risk management instruments, input resources such as land, labor, capital, etc., on different cropping strategies; the marginal values of acquiring additional critical resources and changes in these marginal values; the estimated quantities of marketable, non-critical resources and reasonable asking prices; the effects of variations in market prices, as well as comparing changes in production costs for a particular cropping strategy; the break-even points of different cropping strategies; the profit potential of increasing, decreasing or substituting input resources such as capital, acreage, labor, fertilizers, pesticides, etc.; and the evaluation of risk management strategies specifically the benefits or opportunity costs available through futures options, forward contracting, crop insurance and diversification.

The present invention is thus a valuable tool for farmers and industry professionals who work with those farmers. Moreover, deploying the present invention through an electronic medium such as, for example, the Internet, enables these professionals to work with the farmer-clients remotely and enables unfettered access to the production planning system and requisite data. Some of these third party industry professionals, and the use of the present invention to their core businesses, are the input supply retailers, assisting farmers with production planning decisions. This can lead directly to product sales, since the type and quantity of input products (e.g., seed, fertilizer, crop protection, dates and locations for custom applications) are the result of the production planning analysis. Also, seed and crop protection manufacturers' field representatives using the present invention can assist farmers with production planning decisions. This can lead directly to sales of the input products they represent. Independent crop consultants using the present invention can assist farmers with production decisions, complementing their traditional agronomic services. Crop insurance agents using the present invention can assist farmers with production planning decisions, including evaluating the type and amount of crop insurance in the context of the farmer's overall risk profile. Agricultural lenders using the present invention can assist farmers with production planning decisions, including determining the appropriate amount of an operating loan and proper interest rate based on production and market risk. Marketing advisors using the present invention can assist farmers with production planning decisions to subsequently develop a marketing plan for the farmer based on the selected crop-acreage combination, the amount of contracted acreage and the level of crop insurance. Also, agricultural equipment dealers using the present invention can assist farmers with production planning decisions and help the farmer determine whether equipment capacity is adequate to execute the production plan.

The present invention integrates several independent planning and analysis functions, such as, for example, systems modeling, mathematical programming, optimization techniques and market analysis. These functions are integrally linked within the present invention and combine input from a user-friendly interface with easy-to-understand graphical output. When linked with a farmer's experience and knowledge of farming, the present invention can become a powerful decision-making tool.

In addition, the present invention has the capability to import expected crop budgets and prices from external or third party sources via the Internet or a virtual private network. Other model parameters can also be automatically imported such as, defined bundles of crop inputs and product prices, as well as production contracts and other production risk management products.

The output generated through an interactive session between the user and the present invention is a multi-objective production plan. This plan reflects the user's preferences towards particular crops, associated risk management instruments, available resources, management capabilities and level of risk aversion. In addition, the plan compiles a list of production inputs (including, without limitation, seed, chemical, fertilizer, etc.) and other associated plan elements (including, without limitation, level and type of crop insurance policies, forward production contracts, operating loan requirements, etc.). These production inputs and other associated plan elements may be transmitted electronically (i.e., via the Internet or a virtual private network) to vendor ordering systems for price quotes and/or purchase orders.

These production plans are formulated through an iterative process. The mathematical farm model may systematically be re-analyzed by altering critical resource parameters (i.e., controllable variables) according to output generated by the previous analyses and responses from the user to system queries. The present invention also delineates the effects of increasing or decreasing operating capital, acreage, water, labor, machinery or any other controllable resource, and specifies the amount projected profits will increase or decrease by varying these resource quantities. The present invention points out where increasing critical resources by the equivalent of one dollar has the potential to return several dollars of additional profit, i.e., increasing returns to scale. It can identify the most profitable combinations of crops and acreage that use the least amount of pesticides, water, labor, capital, etc. Conversely, excess resources such as land, machinery, water, etc., can be identified and evaluated for marketability to generate additional revenue. This management information can maximize efficiency and enhance the profit potential of the overall farming enterprise.

Once a final combination of risk management instruments, crops and resources has been selected, the present invention analyzes the sensitivity of the optimal cropping strategy to variances in prices, yields and production costs (i.e., uncontrollable variables or uncertainties). Results under these various scenarios are then displayed. Where appropriate, further sensitivity analysis is performed automatically by the system or driven by the user. Often combinations of price, yield and resource variations are analyzed several times—a process ultimately leading to the generation of more refined and less volatile cropping strategies (by employing further combinations of forward sales and hedging, crop insurance and crop diversification) that satisfy the user's objectives.

Continuous input by the user and feedback via the present invention ensures the evolution of a final production plan that satisfies the user's needs and meets the user's goals. Parametric programming algorithms (i.e., the systematic process of changing model parameters) are used to selectively alter model parameters.

After reviewing sensitivity parameters, the present invention generates alternate cropping strategies. The user can quickly and easily evaluate resource usage, profits, opportunity costs and risks associated with hundreds of thousands of possible variations in crop yields, market prices and resources to optimize crop selection decisions. Information is compiled in easy-to-understand graphical and tabular formats highlighting important parameters in order to help farmers or managers compare and select optimum cropping strategies.

Through interaction with the present invention, a farm-specific knowledge base is built, retained and referenced for future consultations. Information may be supplemented, as necessary, with updated and regionally-specific crop production and marketing data, crop insurance information, etc.

Many aspects of farming are regionally specific; however, production and planning principles are fundamental. Unlike farm management computer software developed by regional land-grant universities, the present invention comprises a universal planning tool that can be used irrespective of locale, crops, or resources. The present invention uses farm-specific and regional data (inputted by the user) and stores this information in a database. The present invention can also use a pre-defined regionally-specific knowledge base to supplement user-supplied information with regional crop, production and marketing data.

One of the major economic advantages of the present invention is the ability to help farmers and farm managers quickly evaluate an infinite number of feasible crop and acreage combinations and associated risk management opportunities to determine optimal cropping strategies. This translates into better management decisions. The present invention quantifies and graphically identifies the most profitable combinations of crops, acreage and resources within the context of a farmer's goals—based upon indicated farm management preferences (i.e., the types of crops under consideration, available risk management instruments, and the amounts and combinations of farm resources used and other predilections), experience, cash flow and projected market conditions. This information helps farmers make more informed and intelligent crop selection decisions.

Further objects and advantages of the present invention within the field of production agriculture will become apparent from a consideration of the drawings and ensuing description.

DETAILED DESCRIPTION OF THE INVENTION

Described below is a preferred method for generating a custom crop production plan using a system for developing single-year or multi-year crop selections, acreage allocations, and resource management strategies for production agriculture so as to evaluate tradeoffs in farming objectives. These tradeoffs include, for example, one or more of the following: profit maximization, risk minimization, resource minimization and other conservation goals. Preferably, the method may comprise one or more of the following aspects:

(a) electronically acquiring from a user, an electronic batch file or a real or near-real time electronic transmission containing information on farm management preferences, physical farm parameters, crop information, and resources which may then be translated into electronic data and stored in a database;

(b) electronically acquiring from a third party industry professional or source, data or information pertaining to one or more of the following: seed prices, fertilizer prices, forward sales production contracts, agriculture insurance rates, futures and options contracts, agriculture marketing information, agriculture consultants' information, agriculture accounting information and agriculture lenders' rates;

(c) using the electronic data to configure a mathematical model which represents a farming enterprise;

(d) analyzing the mathematical model using one or more of the following techniques: linear, integer, mixed integer programming and parametric programming algorithms to generate cropping strategies, acreage allocations and resource management strategies to identify potential trade-offs in the objectives;

(e) generating tabular and graphical output depicting the trade-offs for each strategy;

(f) allowing the user to visualize and interactively alter model parameters to evaluate alternative farm resource allocation strategies which combines the use of a linear programming model and integrated parametric programming with real-time multidimensional trade space analysis and graphics generation; and (g) using the system in a structured planning and analysis framework.

The system of the present invention can be configured to run on a computer (as in the form of software) or other electronic means to perform these functions.

Figure 1:
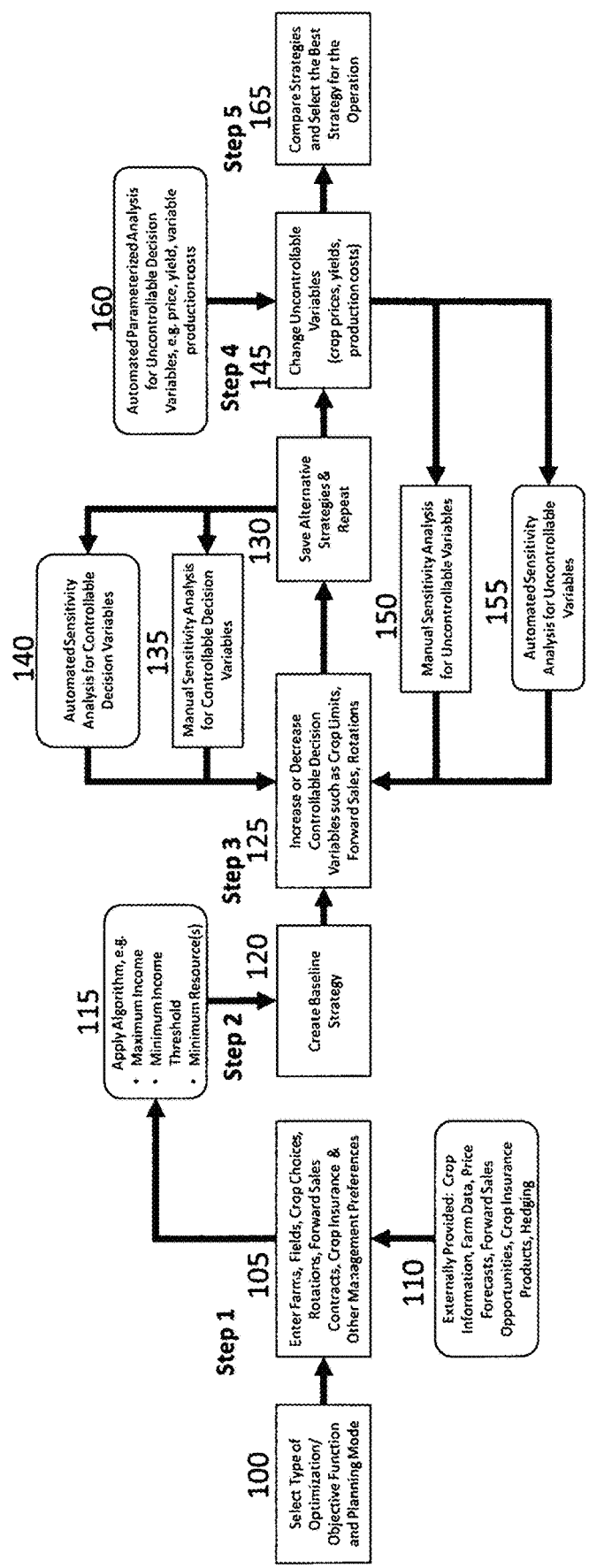
FIG. 1 illustrates a process overview of generating a crop production strategy incorporating the three fundamental enhancements of the present invention to U.S. Pat. No. 6,990,459.

FIG. 1 illustrates a top-level overview of the production planning process described above. The process is preferably comprised of five primary steps.

As shown in Step 1, 100, a user determines the type of optimization model to use. This is based on whether the production plan is field-based or acres-based, i.e. no regard to crop acreage allocation field-by-field as well as the type of objective function to employ. Next, 105, the user enters farm information some of which is crop information such as crop yield and price forecasts and variable production costs and some of which are management decisions such as acreage limits, crop/field choices, rotations, resources and risk management instruments available and under consideration. Externally provided data and information, 110, is used to supplement existing information and provide parameters used to develop feasible risk management decision variables for use in the risk based optimization model. The risk management model to be applied, 115, previously selected by the user, 100, determines the external information, 110, required to construct and populate the model.

As shown in Step 2, 120, the present invention applies the selected algorithm and, assuming there is a feasible solution, generates and displays the baseline strategy. The baseline strategy is the initial strategy created and is used as a benchmark to create new strategies by changing controllable decision variables.

As shown in Step 3, 125-140, controllable decision variables are changed to create additional strategies that further the primary objective, e.g. profit maximization, risk minimization or resource minimization as well as seek to improve on the other two secondary objectives. Favorable strategies are saved for comparison and further analysis, 130. Manual sensitivity analysis, 135, involves the user making changes to farm parameters that affect decision variables and constraints. Automated sensitivity analysis, 140, uses predefined algorithms to determine which controllable parameters to change, in what range to change them and with which other controllable parameters need to be changed simultaneously based on the objective function being employed. Alternative strategies are saved manually or automatically for comparison in Step 4.

As shown in Step 4, 145-160, uncontrollable variables, primarily forecasted crop yields, prices and variable production costs, are changed to create scenarios. Scenarios are used to explore impacts on profitability from the uncertainties inherent in farming such as unknown crop prices and yields prior to planting. Determination of which variables to change either by the user or by the analysis rules, 160, triggers sensitivity analysis of price, yield and variable production costs. Manual sensitivity analysis of uncontrollable variables, 150, involves the user making changes to forecasted crop prices, yields and variable production costs consistently across all strategies and analyzing the outcome in terms of estimated income and certainty bounds around the estimated income. Automated sensitivity analysis of uncontrollable variables, 155, invokes pre-configured analysis rules which change forecasted crop prices, yields and variable production costs in a systematic, automated fashion consistently across all strategies, analyzing the outcome in terms of estimated income and certainty bounds around the estimated income and recursively going back through Step 3 and Step 4 that further the primary objective, e.g. profit maximization, risk minimization or resource minimization as well as seek to improve on the other two secondary objectives. Favorable strategies are saved for comparison and selection in Step 5.

As shown in Step 5, 165, at this point in the planning and analysis process controllable decision variables have been optimized and the impact of uncontrollable variables on these refined crop production strategies have been analyzed. The user compares and selects the strategy. This strategic decision leads to a myriad of subsequent planning activities, field work and input decisions, logistics decisions, and marketing decisions.

Figure 2:
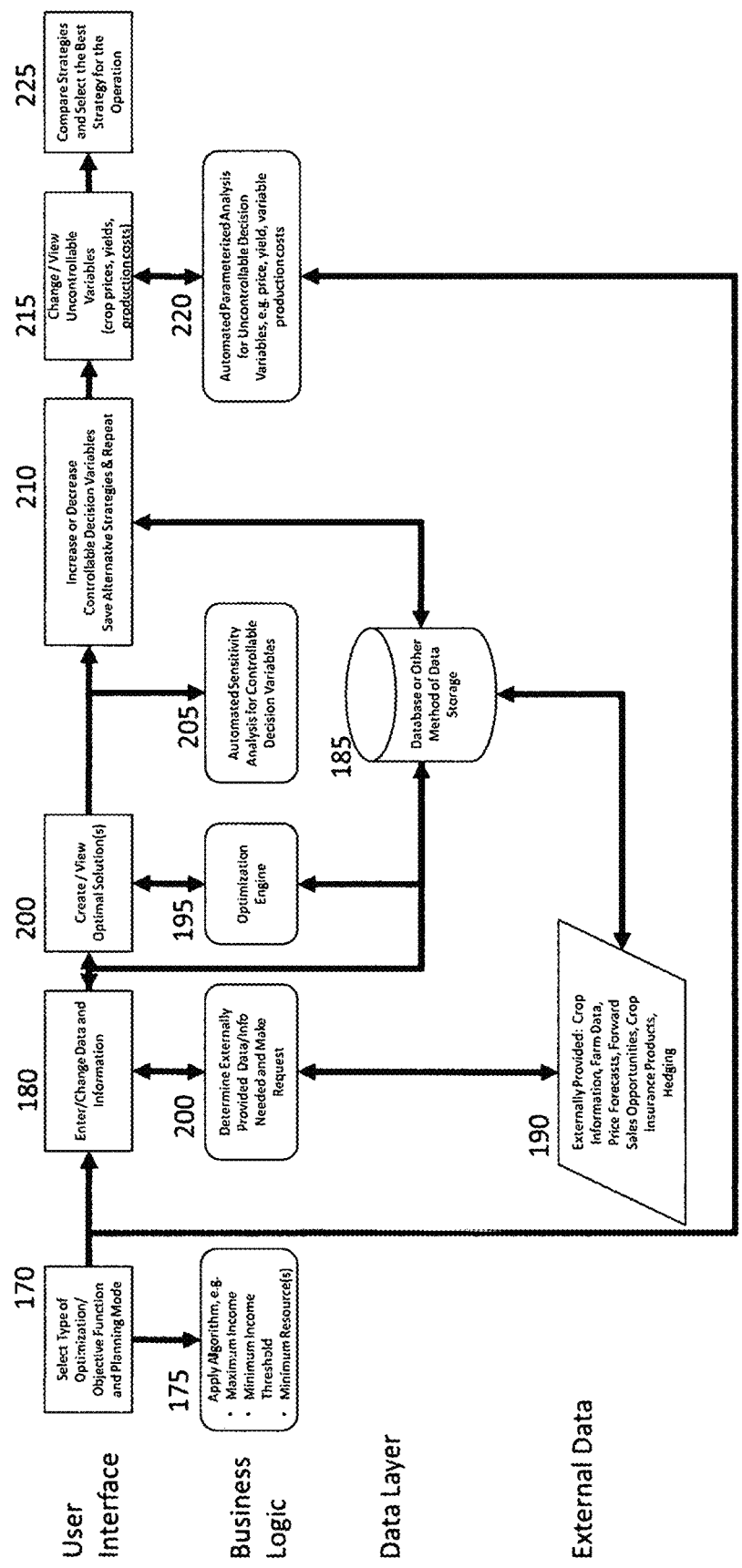
FIG. 2 illustrates an overview of the architecture comprising an example system configuration to deploy the present invention.

FIG. 2 illustrates an embodiment of the present invention to implement the enhanced production planning process of FIG. 1. FIG. 2 shows a high-level view of a configuration of the technology stack. The stack is comprised of three tiers. This architecture includes a user interface, such as that shown in FIGS. 6-9 which are used to collect data, display output and provide a means of interaction between the user and the computer program. The second tier contains the analysis capabilities that take user inputs and the model frameworks to develop the farm-specific model; it also contains the sensitivity analysis rules and automation procedures as well as the rules for rendering output to the user and interacting with user responses (re further analysis). The third tier consists of one or more databases to store data and derived information. The fourth element of the system are gateways to electronically exchange data and information between the production planning system and external sources. Any of these architectural components may be co-located or distributed.

Developing a multi-objective production plan begins with the user selecting the type of optimization model, 170, to deploy from a choice of income maximization, minimum income threshold or minimum resources and whether the production plan will be based on fields or acres. Based on user response, the appropriate algorithms and mathematical model is employed, 175. The user enters farm data and information needed to populate the model, 180. Data is stored in a database or other method of data storage, 185. The need for external data and information is determined based on the model type, 190, web services, or other data exchange means, are launched to retrieve necessary data, 200.

After the model has been determined and all data and information entered the system calls the optimization engine, 195, which solves the model (i.e., system of simultaneous equations) and displays the optimal solution, 200, assuming one or more optimal solutions exists. After returning one or more optimal solutions the software application performs automated sensitivity analysis, 205, on controllable decision variables such as resources, crop limits and risk management instruments (e.g., forward sales, hedging, crop insurance). Results of sensitivity analysis of controllable variables are displayed for the user to review. A control panel, 210, enables the user to interact with the automated sensitivity analysis. Based on direction from the user re which controllable decisions to change, the software application changes model parameters and re-runs the analysis and displays the results for the user to review. This process is repeated multiple times with the user saving optimal crop/acreage combinations for comparative analysis of various risk management strategies.

After the user is satisfied with the results of sensitivity analysis of controllable variables and has saved several strategies, the user specifies which uncontrollable variables to analyze across which crops, (i.e., price, yield and variable production costs) 215. Normally these uncontrollable variables are analyzed across a range of minimum and maximum yields, prices and variable production costs. Subsequently, the software application automatically and incrementally changes these variables, 215-220. Depending on user specified parameters, these variables can be simulated several thousand times to better understand the probability patterns given different risk management strategies. Based on guidance provided by the user, the software application will change some of the controllable variables to try to achieve the user's pre-specified goals as reflected in the chosen model type.

The user interface of the subject invention provides comparative analysis for the user to compare strategies in terms of expected income, risk profiles, resource use, and conservation practices, 225.

Figure 3:
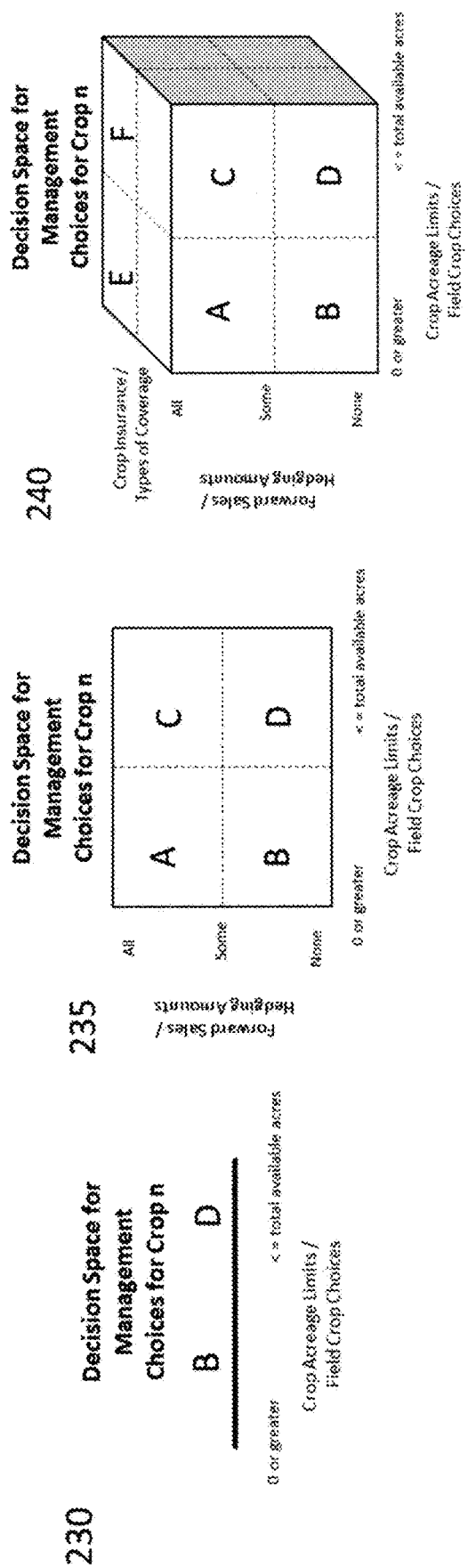
FIG. 3 illustrates the formulation of the set of optimization models showing additional and explicit risk management dimensions, and how scenario analysis of uncontrollable variables is used to drive subsequent analysis iterations.

FIG. 3 illustrates the decision space for risk management choices for a given crop. There are three dimensions to the decision space which in aggregate determine risk management opportunities. These dimensions, in combination with choices in agronomic and production management decisions are used to derive and define the decision variables for the production planning models of the present invention. The first dimension, 230, are minimum and maximum crop acreage limits which represent a farmer's preferences for particular crops and the crop mix or level of diversification; crop acreage limits are continuous when planning by acres and are discrete and further constrained by field-based plans. The second dimension, is for forward sales and hedging, 235, which are actually separate risk management instruments but are considered interdependent on forward sales and acreage limits since hedging in this context is balanced against crop production positions; forward sales and hedging are not available for all crops. The third dimension is for crop insurance, 240, and is represented by a finite number of products available based on the crop and geography; crop insurance is not available for all crops in all geographies. The ability to create risk management decision variables for specific crops depends not only upon the availability of risk management products but the farmer's willingness to use them.

Figure 4:
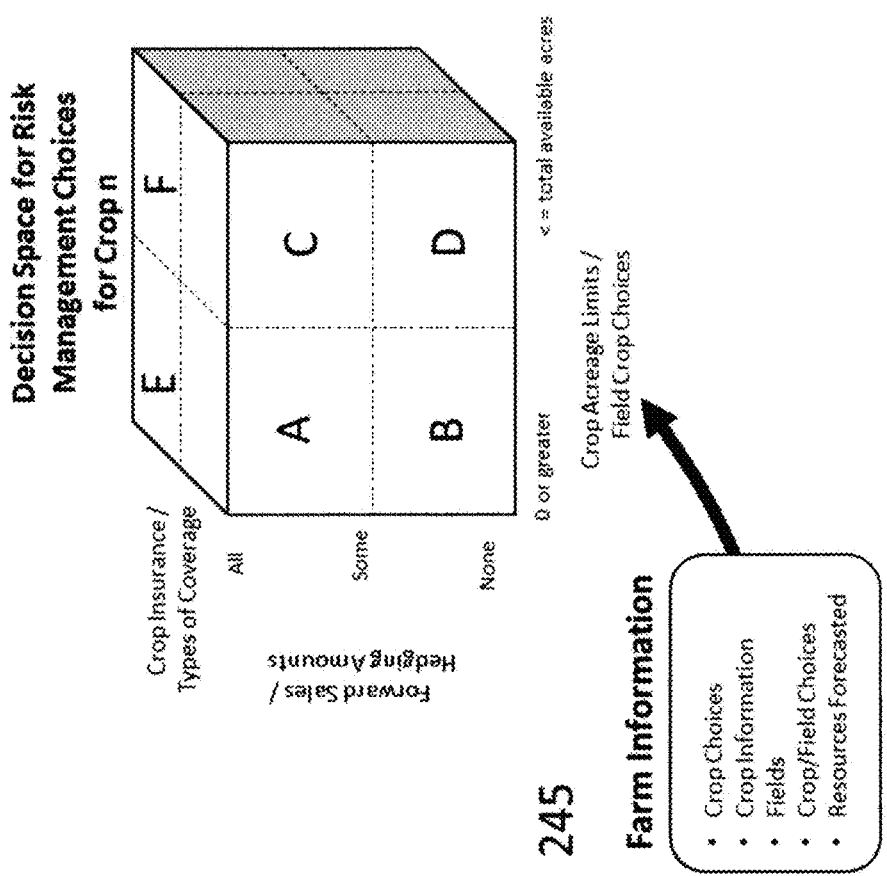
FIG. 4 illustrates the additional and explicit risk management dimensions utilized in the present invention to formulate the set of decision variables needed to support the risk-based optimization models.

FIG. 4 illustrates the merging of the risk management decision variables, FIG. 3, and farm characteristics, 245, to further define decisions variables as well as propagate constraints. These decision variables are used in the optimization model objective function.

The three dimensions of risk management decisions, (i.e., crop acreage limits/field crop choices, forward sales/hedging amounts and crop insurance/types of coverage) are evaluated in one of eight optimization models selected by the user. Decisions variables are used to construct the objective function used by the subject invention to develop multi-objective production plans. The four primary models are:
 (a) Maximize Estimated Income
 (b) Maximize Estimated Income, subject to: Minimum Income Goal
 (c) Minimize Resource Use, subject to: Minimum Income Goal
 (d) Minimize Deviation from Income Goal In addition each of the four models has either a field mode or an acre mode, (i.e., based on fields or acres). Planning by fields, where one and only one crop can be assigned to a given field is represented mathematically and in the subject invention user interface versus if the production plan is developed irrespective of fields.

The first objective function, Maximize Estimated Income, is formulated by linking decision variables with objective function coefficients which represent the potential profit per acre for each decision variable.

Maximize Estimated Income Objective Function:

Since Estimated Income for each crop=[(price×yield)/acre−costs/acre]×no. of acres, then the objective function to be maximized is represented as:

$$\text{Max } Z = \Sigma c_j y_j x_j - p_j x_j$$

where,
 $c_j$=price/unit
 $y_j$=yield/acre for crop $x_j$
 $p_j$=production costs/acre for crop $x_j$ Maximize Estimated Income, Subject to: Minimum Income Goal:

This objective function is similar to the Maximize Estimate Income objective function except that it has a minimum income goal constraint. To support this minimum income goal, constraint numerous additional risk management decision variables are required in addition to the minimum and maximum acreage constraints. These decision variables are predicated on the availability of risk management instruments complementary to crop diversification alternatives such as forward sales, hedging and crop insurance.

Again, Estimated Income for each crop=[(price×yield)/acre−costs/acre]×no. of acres, so the objective function to be maximized is represented as:

$$\text{Max } Z = \Sigma (c_j y_j + a_j) x_j + (b_j) - (p_j x_j + d_j)$$

where,
 $c_j$=price/unit and $y_j$=yield/acre for crop $x_j$
 $a_j$=per acre revenue contribution from crop insurance
 $b_j$=revenue contribution from hedging
 $p_j$=production costs/acre for crop $x_j$ including per acre crop insurance premium
 $d_j$=cost of hedging
 and Minimum income goal (constraint) is:

$$\Sigma(c_j y_j + a_j) x_j + (b_j) - (p_j x_j + d_j)$$

Minimize Resource Use, Subject to: Minimum Income Goal:

This objective function minimizes use of a selected resource (e.g., working capital, water, nutrients) and has a minimum income goal constraint in addition to crop limits and other constraints. To support this minimum income goal constraint, numerous additional risk management decision variables are required in addition to the minimum and maximum acreage constraints. These decision variables are predicated on the availability of risk management instruments complementary to crop diversification alternatives such as forward sales, hedging and crop insurance.

The resource to be minimized is r, so the objective function to be minimized is:

$$\text{Min } Z = \Sigma r_j x_j$$

where,

Minimum income goal (constraint) is:

$$\Sigma((c_j y_j + a_j) x_j + (b_j)) - (p_j x_j + d_j)$$

$c_j$=price/unit
$y_j$=yield/acre for crop $x_j$
$a_j$=per acre revenue contribution from crop insurance
$b_j$=revenue contribution from hedging
$p_j$=production costs/acre for crop $x_j$ including per acre crop insurance premium
$d_j$=cost of hedging Minimize Deviation from an Income Goal:

This objective function minimizes lower bound deviations subject to an income goal. This identifies one or more crop/acreage combinations that meet the minimum income goal under any uncontrollable event (provided a feasible solution exists for the given input parameters). This approach uses different levels of diversification, crop insurance, forward contracting, and hedging strategies and selects the combination of crops coupled with the appropriate risk management instruments that guarantee a certain level of return without foreclosing the opportunity of participating in upside market movements. A derivative of the Least Absolute Deviation (LAD) algorithm is used. To support this objective function, numerous additional risk management decision variables are required in addition to the minimum and maximum acreage constraints. These decision variables are predicated on the availability of risk management instruments complementary to crop diversification alternatives such as forward sales, hedging and crop insurance.

The objective function to be minimized is:

$$\text{Min } Z = \Sigma |((c_j y_j + a_j) x_j + (b_j)) - (p_j x_j + d_j)|$$

Figure 5:
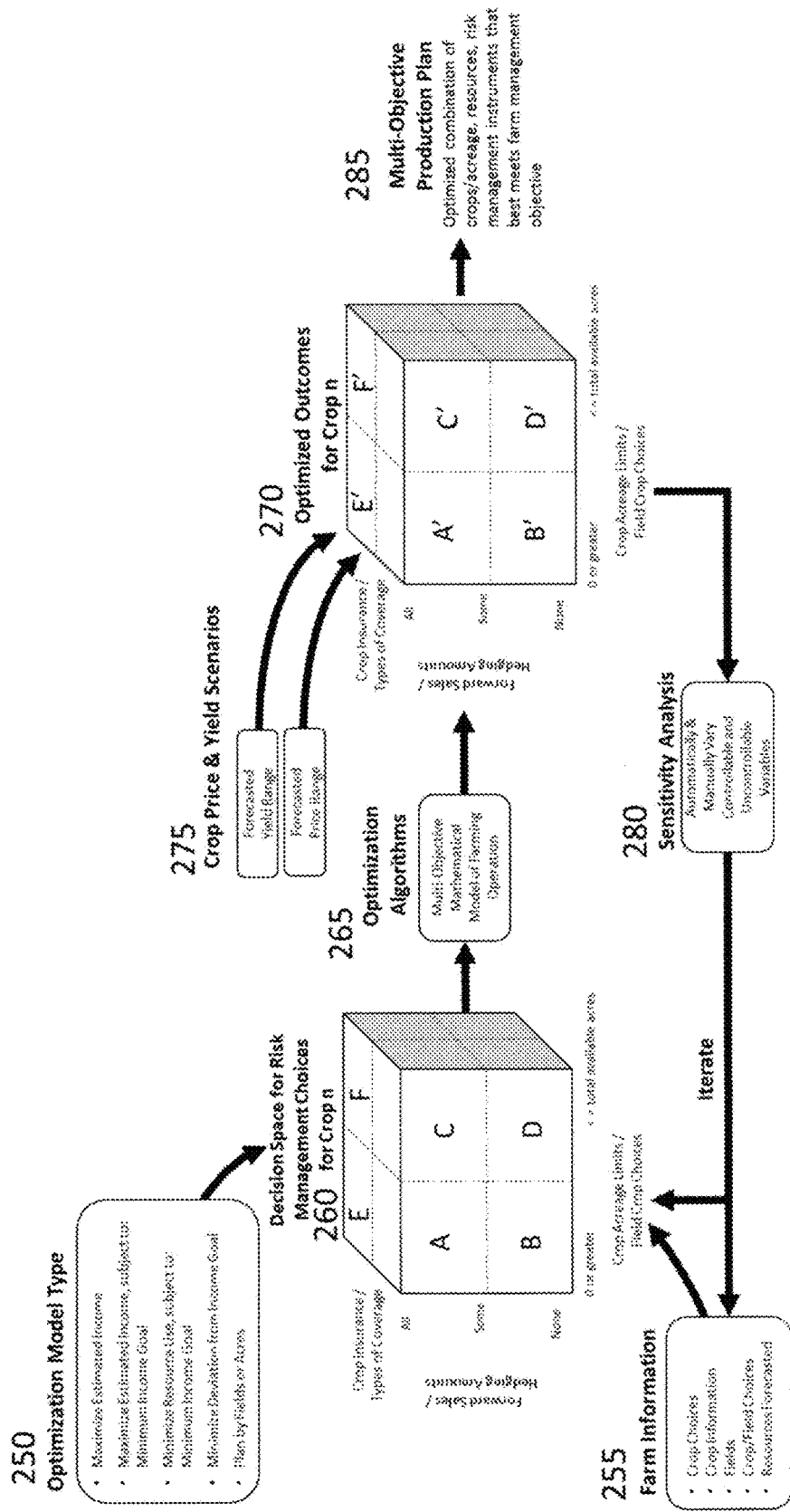
FIG. 5 illustrates the elements of the production planning process embodied in the present invention and built up from subsequent figures.

Maximum deviation (constraint) is:

subject to, e.g. $((c_j y_j + a_j) x_j + (b_j)) - (p_j x_j + d_j) \leq k$ where
$c_j$=price/unit and $y_j$=yield/acre for crop $x_j$
$a_j$=per acre revenue contribution from crop insurance
$b_j$=revenue contribution from hedging
$p_j$=production costs/acre for crop $x_j$ including per acre crop insurance premium
$d_j$=cost of hedging
k is a constant that sets the maximum deviation Decisions variables, objective functions and constraints are captured in FIG. 5 which illustrates the pattern used by the subject invention to develop multi-objective production plans. The three dimensions of risk management decisions, 55 (i.e., crop acreage limits/field crop choices, forward sales/amounts and crop insurance/types of coverage) are evaluated in one of eight optimization models selected by the user.

In FIG. 5, optimization model types, 250, include an objective function, decision variables and a plurality of constraints. Farm information, 255, is collected by the user interface. The model type and farm information are used to define the necessary decision space, 260, for modeling the risk management aspects, in addition to the agronomic and operational aspects of the production plan. After the model is constructed and analyzed, 265, an optimized set of outcomes are derived, 270, based on controllable decisions and an initial set of crop price, yield and variable production costs assumptions which are partly uncontrollable variables, 2. Both the controllable and uncontrollable variables are systematically changed by sensitivity analysis rules, 280, guided by the user and internal decision rules, and the model is re-run and new outcomes generated as a function of the scenarios, 280. This process is iterative. The multi-objective production planning algorithms may alter some controllable farm parameters such as rotations available working capital or may change the mix of risk management instruments such as crop acreage limits or the amount of crop forward sold in order to improve on the plan's ability to withstand adverse outcomes for the aggregate crops in the plan. Finally, when the objective function has been satisfied and one or more optimal combinations of crops, acreage, resources and economic outcomes has been generated, the user evaluates these against individual business and personal goals and selects the one that best meets these subjective criteria.

In addition to the risk management constraints associated with crop acreage limits, forward sales, and minimum income, there are physical constraints (land) and financing constraints (working capital) that are base model constraints and are included in all model types. Constraints are implicitly formulated for capital and land. The program formulates additional constraints, such as other resources. Constraints are formulated by linking decision variables with constraint coefficients, inserting an equality or inequality sign (depending upon the nature of the constraint) and inserting the right hand side value (RHS). The RHS is the availability or amount of the resource constraint. Additional constraints are used to model resource use in aggregate and by each crop/decision variable. As an example, these constraints may include water, nutrients, labor, machinery, crop storage or any other controllable resource. Examples of a land constraint, working capital and generic resource constraints are provided below.

Land Constraint (Planning by Acres):

acres crop 1+acres crop 2+ . . . acres crop $n$<=available acres e.g. $\Box x_1 + x_2 + \ldots x_n <= b_{land}$ Capital Constraint:

production costs crop 1+productions costs crop 2+production costs crop $n$<=available capital e.g. $\Box p_1 x_1 + p_2 x_2 + \ldots p_n x_n <= b_{capital}$ Resource Constraint:

resource use crop 1+resource use crop 2+resource use crop $n$<=available resource e.g. $\Box r_1 x_1 + r_2 x_2 + \ldots r_n x_n <= b_{resource1}$ or
$\Box r_{ij} xj <= b_{resource1}$ Taken together the subject invention provides a production planning model, FIG. 5 265, comprised of:
(a) a specific type of objective function,
(b) dependent and independent risk-based and other decision variables, and
(c) a plurality of constraints that model production and market risk management, resource management and stewardship considerations.

FIG. 5, 270, illustrates the optimized outcomes in terms of selected risk-based decision variables for a given crop based the overall set of crops and their associated risk-based decision variables. The amount of each risk management instrument to employ for each crop is interdependent with the set of risk management instruments across all other crops.

FIG. 5, 275, illustrates exercising a range of uncontrollable variables against the optimized solution; these uncontrollable variables are primarily price and yield, but also include variable production costs. These are used to test the robustness of a strategy (i.e. a specific mix or crops/fields/acres) against uncontrollable events that create uncertainty and lead to market and production risks. These scenarios may be user defined, formula generated, or captured from external forecasts.

FIG. 5, 280, shows use of internal and user-driven sensitivity analysis rules used to generate additional strategies for comparison. This process is performed in two phases. Phase one involves altering available amounts of controllable variables such as land, capital, water, labor, devoted crop acreage. Phase 2 involves altering uncontrollable variables reflected in changes to objective function coefficients and income constraint coefficients such as crop prices, crop yields, and production costs whereby the user or the internal rules make iterative changes to risk management and other decision variables that generate strategies that meet defined parameters of income, minimum income, resource use and asset management goals.

Phase 1 sensitivity analysis has two branches depending upon the model type. One branch is driven by incrementally changing critical resource availabilities using pre-defined decision rules or through interaction with the user. The other branch is driven by risk management considerations (e.g. more or less diversification, more or less forward selling or hedging, more or less crop insurance) which expands the decision space shown in FIG. 5, 260, and thereby (depending on the crop) provides additional opportunities to meet the multi-objective farm management goals. These branches can be pursued independently or together, manually or automatically by internal sensitivity analysis rules.

In Phase 1 sensitivity analysis, changes to risk management and resource-related decision variables instantly illustrate how changes in controllable decisions impact estimated income and resource use. Thus, the subject invention provides a means for the user to visualize and interactively alter multi-objective farm model parameters to evaluate alternative risk management and farm resource allocation strategies using a linear programming model integrated with parametric programming and with real-time multidimensional trade space analysis and graphics generation.

In summary, the first phase of Sensitivity Analysis Process 18 defines a method for programming a digital computer for allocating physical farm resources using one or more techniques selected from the following: linear, integer, mixed integer programming, and parametric programming algorithms to generate cropping strategies, acreage allocations, and resource management strategies to identify trade-offs in said objectives, wherein said method comprises one or more of the steps selected from the group consisting of:

(a) means for prescribing a model with a specific objective function based on user intent and a plurality of constraints which adequately describes feasible allocations of said physical resources and optimum use of risk management instruments including crop diversification, (b) means for creating and evaluating risk management decisions which are strictly feasible, (c) means for identifying a tentative physical resource allocation which is strictly feasible, (d) means for iteratively improving said tentative risk management strategy and resource allocation by altering said tentative risk management decision variables and resource allocations in the direction specified by said objective function and said farming objectives, and (e) means for identifying risk management instruments and said allocations and communicating said instruments and allocations to the user.

In summary the more general application describes a method for programming a digital computer for selecting appropriate risk management instruments allocating physical resources using one or more techniques selected from the following: linear, integer, mixed integer programming, and parametric programming algorithms to generate production strategies, risk management, resource allocation strategies to identify trade-offs in said production management objectives wherein said method comprises one or more of the steps selected from the group consisting of:

(a) means for prescribing a model with a specific objective function based on user intent and a plurality of constraints which adequately describes feasible allocations of said physical resources and optimum use of risk management instruments including enterprise diversification, (b) means for creating and evaluating risk management decisions which are strictly feasible, (c) means for identifying a tentative physical resource allocation which is strictly feasible, (d) means for iteratively improving said tentative risk management strategy and resource allocation by altering said tentative risk management decision variables and resource allocations in the direction specified by said objective function and said farming objectives, and (e) means for identifying risk management instruments and said allocations and communicating said instruments and allocations to the user.

The second phase of the sensitivity analysis process deals with uncertainties inherent in farming namely: crop prices, crop yields and crop production costs. A crop production strategy includes a combination of risk management methods, even if it is only crop diversification, (i.e. there are no opportunities for forward sales and hedging or crop insurance). A strategy has a defined risk profile that is a function of the combination of risk management instruments employed and includes parameters such as estimated income given a specific set of crop prices, yields and production costs. The goal of the second phase of the sensitivity analysis is to make changes to this mix of risk management instruments and other controllable decisions to make a strategy's outcome, (i.e. estimated income) relatively insensitive to uncertainty in crop prices, crop yields and crop production costs (within designated bounds) and by this method minimize potential downside risk without a commensurate reduction in upside profitability.

Figure 6:
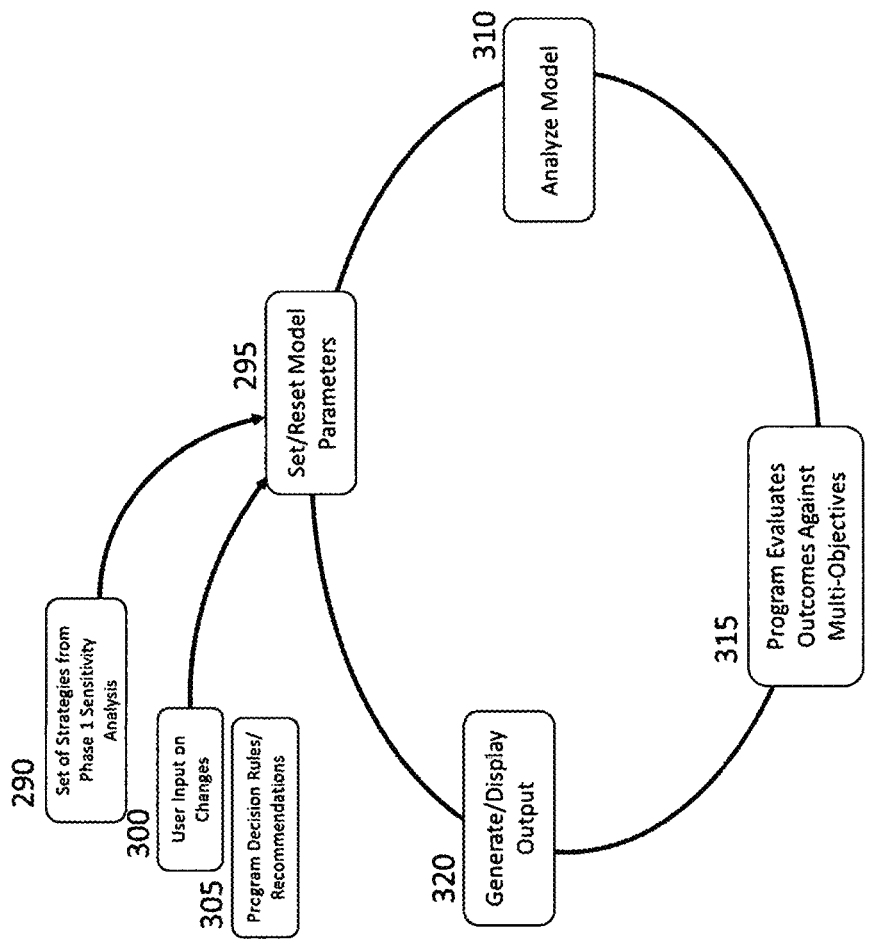
FIG. 6 illustrates the iterative approach to modifying controllable risk-based and non-risk-based decisions and generating new strategies.

As illustrated in FIG. 6, 290, the set of strategies (i.e. optimized mix of crops/acres/fields, resources and risk management instruments) brought forward from Phase 1 Sensitivity Analysis are used to establish the model. Analysis parameters, 295, are defined by the user, 300, and by the program, 305 which provide the direction for the analysis and make changes to combinations of controllable decisions variables, 315. The program analyzes the model, 310, by selecting appropriate risk management instruments allocating physical resources using one or more techniques selected from the following: linear, integer, mixed integer programming, to generate and display output strategies, 320. Then the process from 295-320 is repeated until the program terminates due to the lack of further feasible solutions or the user terminates the analysis. This method allows the user to generate and evaluate risk scenarios for almost any cropping scenario. It addresses crops that have the full complement of risk management instruments available to those that have none, but contribute to the diversification dimension of farm risk management.

In summary, the second phase of the Sensitivity Analysis Process, FIG. 6, defines a method for programming a digital computer for meeting multiple farm management objectives comprising a means for assigning farming resources to specific crop enterprises in combination with a means for identifying and quantifying deployment of risk management instruments affecting the uncertainty of optimal solutions of crop selection, acreage allocation, and resource management strategies against variations in crop prices, crop yields, or production costs for each said assignment wherein said method comprises one or more of the steps selected from the group consisting of:
  (a) means for generating strategies that are less sensitive to variations in crop prices,
  (b) means for generating strategies that are less sensitive to variations in crop yields,
  (c) means for generating strategies that are less sensitive to variations in crop production costs,
  (d) means for generating strategies that reduce downside risk without a commensurate reduction estimated income during expected or favorable outcomes.

Although the previous section, Phase 1 and Phase 2 Sensitivity Analyses—encompasses an application of this process and functionality in production agriculture, these sub processes are applicable to other types of production. Manufacturing production decisions in general have direct analogs to production decisions in farming. Both have objective functions to be maximized or minimized. Both have resource or subjective management constraints (such as minimum income and input resources), and in general both have differing rates of resource consumption/productivity for each decision variable. Therefore, this computer program with little modification could be used as a decision support tool for production decisions in other fields of use.

This more general application describes a method for programming a digital computer for meeting multiple production management objectives comprising a means for assigning resources to specific enterprises in combination with a means for identifying and quantifying deployment of risk management instruments affecting the uncertainty of optimal solutions of production plans including resource management strategies against variations in product prices, productivity, or production costs for each said assignment wherein said method comprises one or more of the steps selected from the group consisting of:
  (a) means for generating strategies that are less sensitive to variations in output product prices,
  (b) means for generating strategies that are less sensitive to variations in productivity,
  (c) means for generating strategies that are less sensitive to variations in production costs,
  (d) means for generating strategies that reduce downside risk without a commensurate reduction estimated income during expected or favorable outcomes.

Figure 7:
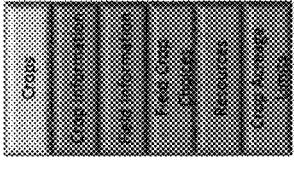
FIG. 7 illustrates an example of the present invention's user interface that determines the type of optimization model to deploy and what risk management instruments are available and that the user would like to consider.

FIG. 7 illustrates a user interface of the present invention that enables a user to select an initial model type, risk management preferences and access data input screens. FIG. 7, 325, shows how the user selects one of four objective functions based on farming goals. The user selects the planning mode, 330, i.e. whether the production plan will be developed based on fields or acres. Access to data input screens, 335, enables the user to enter or change model input parameters via a compact navigation menu. A grid of risk management instruments, 340, shows the user which instruments are available for each crop. All of the information needed to construct the production planning model is provided through this user interface.

Figure 8:
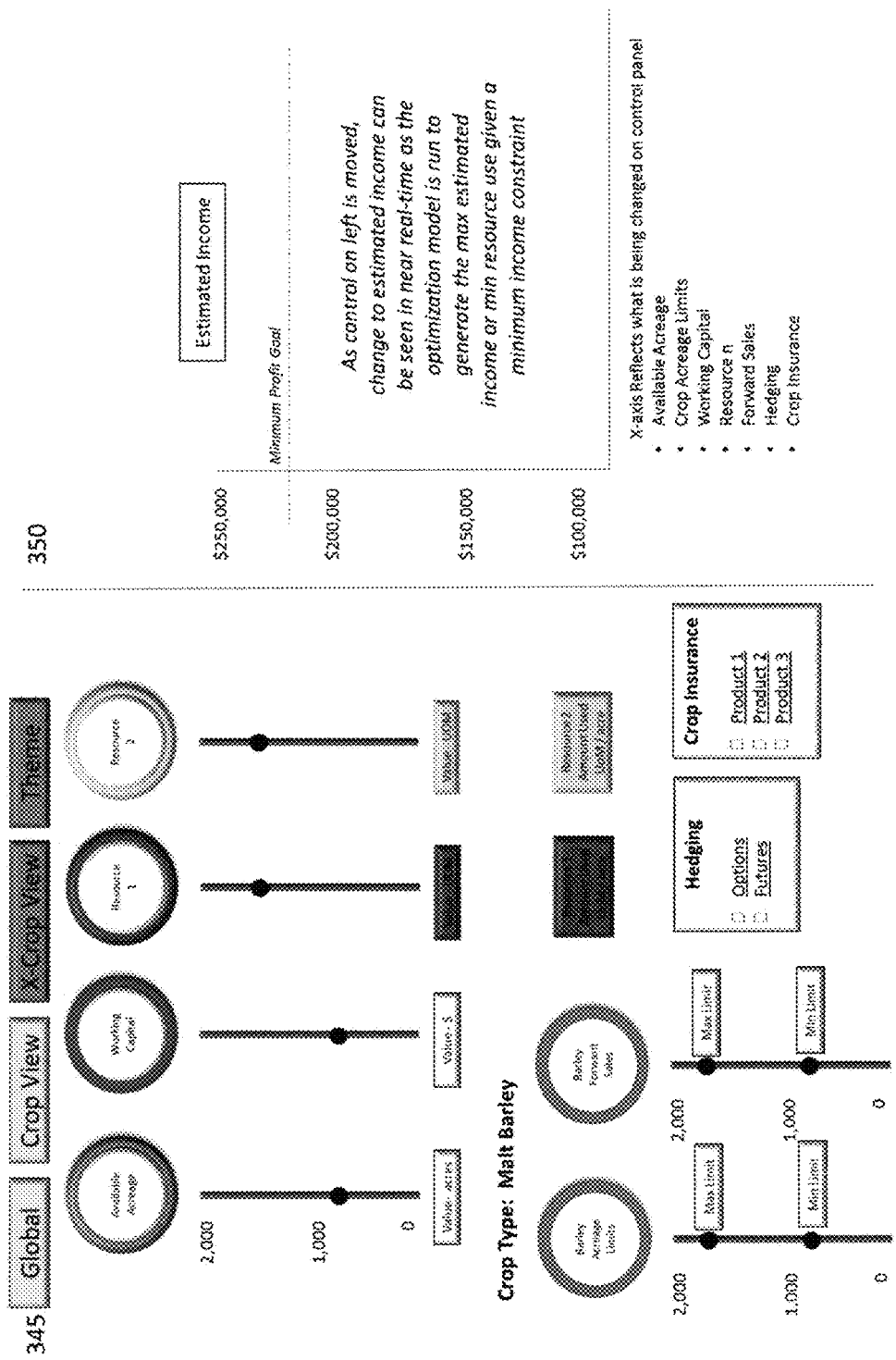
FIGS. 8-9 illustrates examples of one view the present invention's user interface to change farm management decisions in the model by setting farm information values and setting risk management parameters and how, in real-time, changes to these inputs affect income and other outputs.

FIG. 8, 345, illustrates a user interface whereby the user can set or change controllable decision variables representing the three dimensions of risk management instruments (crop acreage limits, forward sales and hedging, and crop insurance) and resource-related model parameters. As controllable model parameters are changed by the user, the model is run and new strategies are generated and displayed to the user in real-time, 350. This provides the user with immediate feedback on the impact of changes in controllable decision variables. The user can save favorable strategies for comparison with other strategies or for further analysis.

Figure 9:
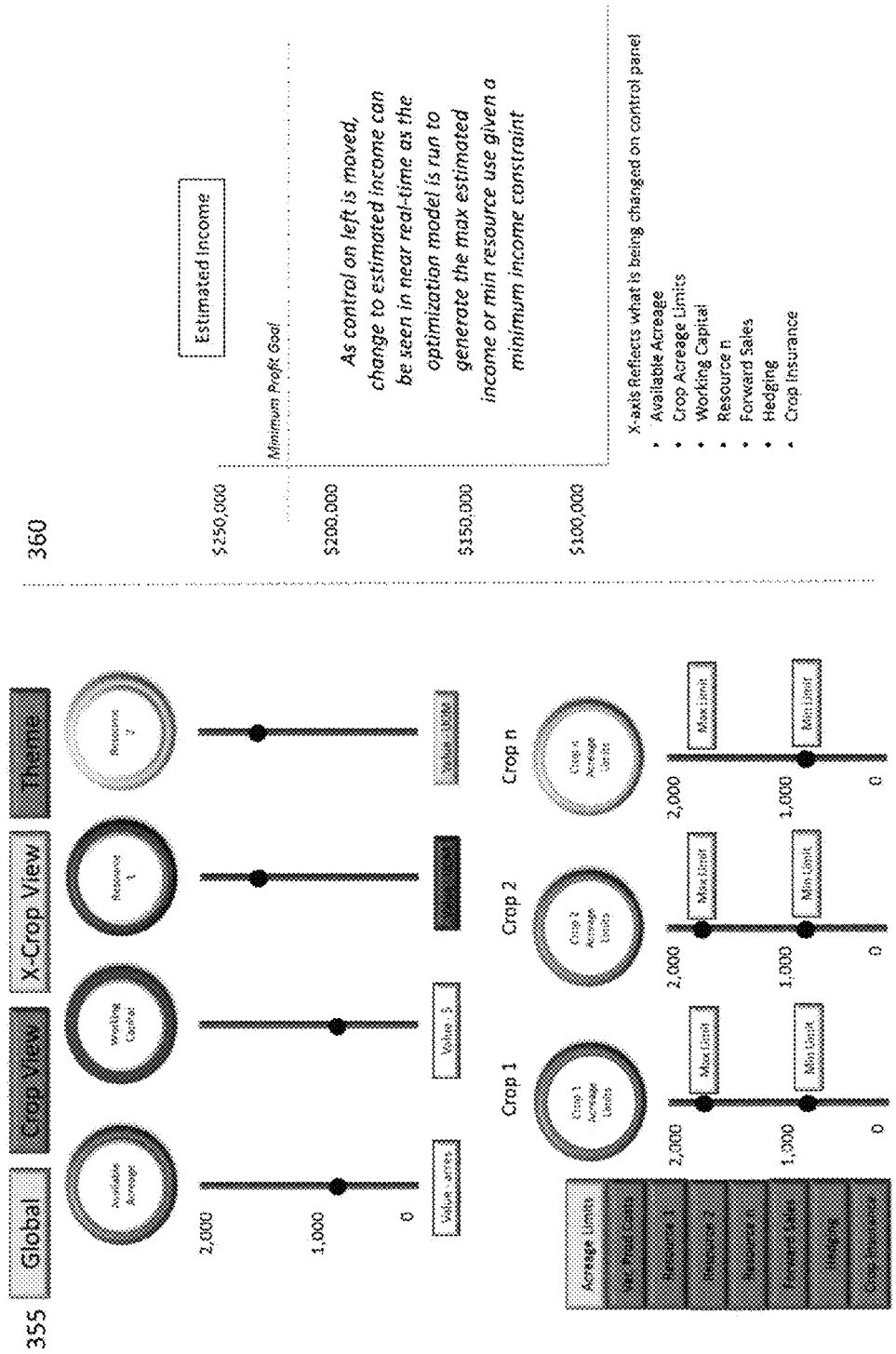

FIG. 9, 355, illustrates another view of the user interface for setting or changing model parameters that provides a view across all crops under consideration. Again, the user can assess the impact of changes to controllable decision variables by viewing output on the right side of the screen, 360.

Figure 10:
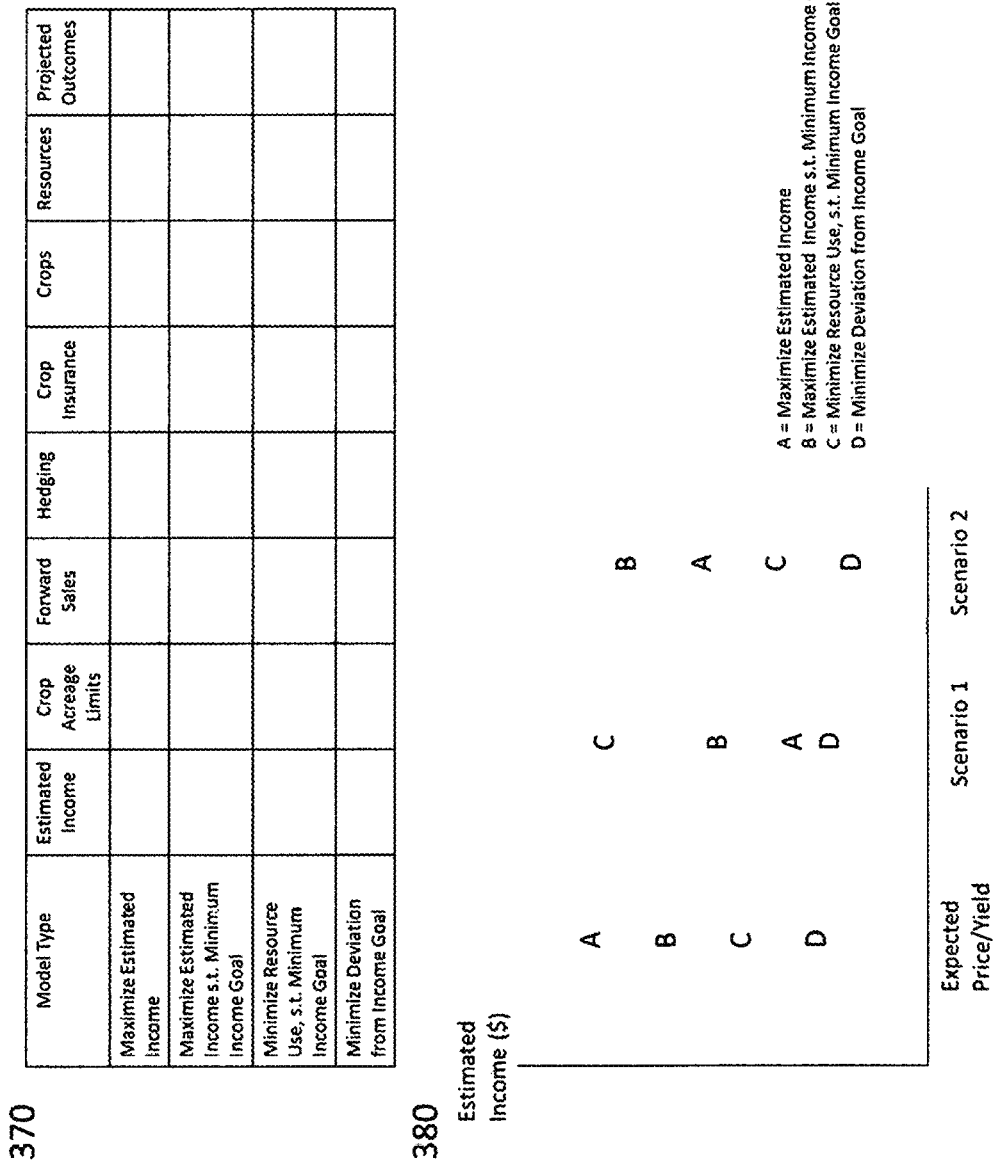
FIG. 10 illustrates an example of the output produced by the subject invention from the four different types of objective function-driven production plans, provided to a user in tabular display as well as a graphical display.

FIG. 10, 370, illustrates an example of the output produced by the subject invention from the four different types of objective function-driven production plans, provided to a user in tabular display as well as a graphical display, 380.

SUMMARY, RAMIFICATIONS, AND SCOPE

As has been illustrated, the method of the present invention described above can be useful in identifying cropping scenarios that optimize utilization of controllable farm resources such as land, capital, labor, water, machinery and chemicals in order to maximize farm income, minimize resource use, and/or minimize risk by identifying combinations of risk management instruments that dampen adverse impacts from uncontrollable variables such as crop prices, yields and production costs.

Accordingly, the reader will see that the method described can be useful in identify cropping strategies that, first, optimize utilization of controllable farm resources such as land, capital, labor, water, machinery, etc., in order to maximize farm profit or minimize resource use and then minimize risk by identifying uncontrollable variables and alternative cropping strategies that are insensitive to these uncontrollable variables such as crop prices, yields, and production costs.

Although the description above contains many specificities, these should not be construed as limiting the scope of the invention but as merely providing illustrations of some of the presently preferred embodiments of this invention. For example, other resources such as fuel or seed could be used to build constraints. Also, the method can be applied to multiple farming operations and multi-season operations.

As continually stated throughout the Specification, this method for programming a digital computer and the underlying method of constrained optimization could be used to assist one with many other types of production decisions. The method for interactively combining use of a linear programming model and integrated parametric programming with real-time multidimensional trade space generation and analysis could be used in other constrained optimization problems outside of the field of production agriculture. Thus the scope of the invention should be determined by the appended claims and their legal equivalents, rather than by the examples given.

The invention claimed is:

1. A computer implemented method for developing multi-objective crop production plans for production agriculture on a per area basis, comprising:

receiving, using one or more computing devices, first information pertaining to a farm, the first information comprising one or more of crop choices, farm management preferences, physical farm parameters, crop production cost information, and farm resources;

receiving, using the one or more computing devices, second information on available risk management instruments, the second information comprising one or more of forward sales, hedging, and crop insurance;

representing, using the one or more computing devices, a combination of the first and second information as decision variables for use in selected mathematical models of a farming operation;

generating, using the one or more computing devices, a multi-objective production plan by solving the selected mathematical models, the selected models being selected from a first model, a second model, a third model, and a fourth model and also including at least one of the first model, the second model, and the third model, wherein:

the first model comprises an objective function to maximize an estimated income subject to a minimum income constraint, wherein the objective function to maximize the estimated income is expressed as: Max $Z=\Sigma(c_j y_j+a_j)x_j+(b_j)-(p_j x_j+d_j)$; and the minimum income constraint is expressed as: $\Sigma(c_j y_j+a_j)x_j+(b_j)-(p_j x_j+d_j)$;

the second model comprises an objective function to minimize a resource use subject to the minimum income constraint, wherein the objective function to minimize the resource use is expressed as: Min $Z=\Sigma r_j x_j$;

the third model comprises an objective function to minimize a deviation from a profit goal subject to the minimum income constraint, wherein the objective function to minimize the deviation from the profit goal is expressed as: Min $Z=\Sigma|((c_j y_j+a_j)x_j+(b_j))-(p_j x_j+d_j)|$;

the fourth model comprises an objective function to maximize an estimated income objective, wherein the objective function to maximize the estimated income is expressed as:

Max $Z=\Sigma c_j y_j x_j - p_j x_j$;

wherein, for the first, second, third, and fourth models, Max Z represents a maximization function; Min Z represents a minimization function; $c_j$ is a price per unit for crop identifier j; $x_j$ is a decision variable; $y_j$ is a yield per area for crop identifier j; $p_j$ is a production costs per area for crop identifier j, $a_j$ is a per area revenue contribution from crop insurance for crop identifier j, $b_j$ is a revenue contribution from hedging for crop identifier j, and k is a constant that sets a maximum deviation; and providing to a user, using the one or more computing devices, the generated multi-objective production plan.

2. The method according to claim 1, wherein providing the multi-objective production plan to a user comprises providing at least one of a graphical display or tabular display.

3. The method according to claim 1, wherein providing the multi-objective production plan to a user further comprises providing crop selection and/or allocation of farm resources for annual and multi-seasonal crop production strategies.

4. The method according to claim 3, wherein the farm resources comprise one or more of capital, land, labor, equipment, crop storage, irrigation system capacity, water rights, and nutrient use.

5. The method according to claim 1, wherein the crop production cost information comprises one or more of seed cost, nutrient cost, crop protection product cost, crop insurance rates, and agricultural marketing information.

6. The method according to claim 1, further comprising performing, using the one or more computing devices, an iterative process to determine additional production strategies, wherein the iterative process comprises modifying at least one controllable variable associated with one or more of the mathematical models, the at least one controllable variable comprising one or more of crops, crop rotation patterns, differing amounts of risk management instruments including production contracts, crop insurance and levels of crop diversification, and controllable resources.

7. The method according to claim 6, wherein the controllable resources include one or more of working capital, land, available water, crop storage, and equipment.

8. The method according to claim 6, wherein the iterative process further comprises modifying at least one uncontrollable variable of one or more of the mathematical models, the at least one uncontrollable variable comprising one or more of crop prices, crop yields, and crop variable production costs.

9. The method according to claim 6, further comprising providing, using the one or more computing devices, comparisons between the additional production strategies based on estimated income at various price, yield, variable production cost scenarios, opportunity cost risk, and resource use.

10. The method according to claim 1, wherein the selected mathematical models further comprise a land use constraint expressed as:

$\Sigma x_j <= b$, wherein b is a total available area.

11. The method according to claim 1, wherein the selected mathematical models further comprise crop area constraints expressed as:

$\Sigma x_j <= g$, wherein g is a minimum area for a crop or group of crops.

12. The method according to claim 1, wherein the selected mathematical models further comprise maximum crop area constraints expressed as:

$\Sigma x_j >= h$, wherein h is a maximum area for a crop or group of crops.

13. The method according to claim 1, wherein the selected mathematical models further comprise resource constraints expressed as the following equation:

$\Sigma r_{ij} x_j <= m$, wherein $r_{ij}$ is a constraint coefficient that represents a measure of resource consumption of resource i, for crop identifier j, and m is a maximum available amount of the resource.

14. The method of claim 1, further comprising analyzing, using the one or more computing devices, the mathematical models on a per acre basis, a per hectare basis, a square meter basis, or other common unit of measure of land area.

15. The method of claim 1, further comprising analyzing, using the one or more computing devices, the mathematical models on a per field basis, wherein the Max Z functions in model a and model d and the Min Z functions in the second model and the third model are multiplied by $B_{in}$, wherein $B_{in}$ is a binary variable with a value of 0 or 1, representing the presence or absence of a planted crop i in field n.

16. A non-transitory computer-readable medium (NT-CRM) comprising computer-readable program instructions to develop multi-objective crop production plans for production agriculture on a per area basis embodied thereon, wherein execution of the instructions by one or more processors of a computer is operable to cause the computer to:
receive information pertaining to a farm comprising one or more of crop choices, farm management preferences, physical farm parameters, crop production cost information, and farm resources;
receive information on available risk management instruments comprising one or more of forward sales, hedging, and crop insurance;
represent a combination of the received information on available risk management instruments as decision variables for use in a selected set of mathematical models of a farming operation;
generate a multi-objective production plan using the selected set of mathematical models selected from a first model, a second model, a third model, and a fourth model, and also using at least one of the first, second, and third models, wherein:
the first model is to maximize an estimated income objective function subject to a minimum income constraint, wherein a mathematical model for the estimated income objective function is expressed as:

Max $Z=\Sigma(c_j y_j+a_j)x_j+(b_j)-(p_j x_j+d_j)$;

and the minimum income constraint is expressed as the following representation:

$\Sigma(c_j y_j+a_j)x_j+(b_j)-(p_j x_j+d_j)$;

the second model is to minimize a resource use objective function subject to the minimum income constraint, wherein a mathematical model for the resource use objective function is expressed as:

Min $Z=\Sigma r_j x_j$;

the third model is to minimize deviation from a profit objective function subject to the minimum income constraint, wherein a mathematical model for the profit objective function is expressed as:

Min $Z=\Sigma|((c_j y_j+a_j)x_j+(b_j))-(p_j x_j+d_j)|$;

and optionally
the fourth model is to maximize an estimated income objective function, wherein a mathematical model for the estimated income objective function is expressed as:

Max $Z=\Sigma c_j y_j x_j - p_j x_j$;

wherein, for the first, second, third, and fourth models, Max Z represents a maximization function; Min Z represents a minimization function; $c_j$ is a price per unit for crop identifier j; $x_j$ is a decision variable; $y_j$ is a yield per area for crop identifier j; $p_j$ is a production costs per area for crop identifier j, $a_j$ is a per area revenue contribution from crop insurance for crop identifier j, $b_j$ is a revenue contribution from hedging for crop identifier j, and k is a constant that sets a maximum deviation; and provide to a user the generated multi-objective production plan.

17. The NTCRM of claim 16, wherein, to provide the multi-objective production plan to a user, execution of the instructions is to cause the computer to provide at least one of a graphical display or tabular display.

18. The NTCRM of claim 16, wherein, to provide the multi-objective plan to a user, execution of the instructions is to further cause the computer to provide crop selection and/or allocation of farm resources for annual and multi-seasonal crop production strategies.

19. The NTCRM of claim 16, wherein execution of the instructions is to further cause the computer to:
perform an iterative process to determine additional production strategies, wherein, to perform the iterative process, execution of the instructions is to further cause the computer to:
modify at least one controllable variable associated with one or more of the mathematical models, the at least one controllable variable comprising one or more of crops, crop rotation patterns, differing amounts of risk management instruments including production contracts, crop insurance and levels of crop diversification, and controllable resources.

20. The NTCRM of claim 19, wherein, to perform the iterative process, execution of the instructions is to further cause the computer to: modify at least one uncontrollable variable of an output of one or more of the mathematical models, the at least one uncontrollable variable comprising one or more of crop prices, crop yields, and crop variable production costs.

21. The NTCRM of claim 19, wherein execution of the instructions is to further cause the computer to: provide comparisons between the additional production strategies based on estimated income at various price, yield, variable production cost scenarios, opportunity cost risk, and resource use.

22. The NTCRM of claim 16, wherein the set of mathematical models further comprise a land use constraint expressed as:

$\Sigma x_j <= b$, where b is a total available area.

23. The NTCRM of claim 16, wherein the set of mathematical models further comprise crop area constraints expressed as:

$\Sigma x_j <= g$, where g is a minimum area for a crop or group of crops.

24. The NTCRM of claim 16, wherein the set of mathematical models further comprise maximum crop area constraints expressed as:

$\Sigma x_j >= h$, where h is the is a maximum area for a crop or group of crops.

25. The NTCRM of claim 16, wherein the set of mathematical models further comprise resource constraints expressed as:

$\Sigma r_{ij} x_j <= m$, where $r_{ij}$ is a constraint coefficient that represents a measure of resource consumption of resource i, for crop identifier j, and m is a maximum available amount of the resource.

26. A computer system for developing multi-objective crop production plans for production agriculture on a per area basis, comprising:

at least one computer processor; and a computer-readable storage device storing computer program code adapted to execute on the computer processor, the at least one computer processor is configurable to:

receive first information pertaining to a farm, the first information comprising one or more of crop choices, farm management preferences, physical farm parameters, crop production cost information, and farm resources;

receive second information on available risk management instruments, the second information comprising one or more of forward sales, hedging, and crop insurance;

represent a combination of the first information and the second information as decision variables for use in mathematical models of a farming operation;

generate a multi-objective production plan using one or more of the mathematical models selected from a first model, a second model, a third model, and a fourth model and at least one of the first model, the second model, the third model, and the fourth model, wherein:

the first model comprises an objective function to maximize an estimated income subject to a minimum income constraint, wherein the objective function to maximize the estimated income is expressed as: Max $Z=\Sigma(c_j y_j+a_j)x_j+(b_j)-(p_j x_j+d_j)$; and the minimum income constraint is expressed as the following representation: $\Sigma(c_j y_j+a_j)x_j+(b_j)-(p_j x_j+d_j)$;

the second model comprises an objective function to minimize a resource use subject to the minimum income constraint, wherein the objective function to minimize the resource use is expressed as: Min $Z=\Sigma r_j x_j$;

the third model comprises an objective function to minimize deviation from a profit subject to the minimum income constraint, wherein the objective function to minimize the deviation from the profit is expressed as: Min $Z=\Sigma|((c_j y_j+a_j)x_j+(b_j)-(p_j x_j+d_j)|$; and the fourth model comprises an objective function to maximize an estimated income, wherein the objective function to maximize the estimated income is expressed as:

Max $Z=\Sigma c_j y_j x_j - p_j x_j$;

wherein for the first, second, third, and fourth models, Max Z represents a maximization function; Min Z represents a minimization function; $c_j$ is a price per unit for crop identifier j; $x_j$ is a decision variable; $y_j$ is a yield per area for crop identifier j; $p_j$ is a production costs per area for crop identifier j, $a_j$ is a per area revenue contribution from crop insurance for crop identifier j, $b_j$ is a revenue contribution from hedging for crop identifier j, and k is a constant that sets a maximum deviation; and provide to a user the generated multi-objective production plan.

27. The system according to claim 26, wherein, to provide the multi-objective production plan to the user, the at least one processor is configurable to provide at least one of a graphical display or tabular display.

28. The system according to claim 26, wherein, to provide the multi-objective production plan to the user, the at least one processor is further configurable to provide crop selection and/or allocation of farm resources for annual and multi-seasonal crop production strategies.

29. The system according to claim 26, wherein at least one processor is configurable to perform an iterative process, and determine additional production strategies, wherein the iterative process comprises modification of at least one controllable variable associated with one or more of the mathematical models, the at least one controllable variable comprising one or more of crops, crop rotation patterns, differing amounts of risk management instruments including production contracts, crop insurance and levels of crop diversification, and controllable resources.

30. The system according to claim 29, wherein, to perform the iterative process, the at least one processor is further configurable to modify at least one uncontrollable variable of one or more of the mathematical models, the at least one uncontrollable variable comprising one or more of crop prices, crop yields, and crop variable production costs.

31. The system according to claim 26, wherein at least one processor is configurable to provide comparisons between the additional production strategies based on estimated income at various price, yield, variable production cost scenarios, opportunity cost, risk, and resource use.

32. The system according to claim 26, wherein the mathematical models comprise a land use constraint expressed as:

$\Sigma x_j <= b$, wherein b is a total available area.

33. The system according to claim 26, wherein the mathematical models comprise crop area constraints expressed as:

$\Sigma x_j <= g$, wherein g is a minimum area for a crop or a group of crops.

34. The system according to claim 26, wherein the mathematical models comprise maximum crop area constraints expressed as:

$\Sigma x_j >= h$, wherein h is a maximum area for a crop or a group of crops.

35. The system according to claim 26, wherein resource constraints are expressed as:

$\Sigma r_{ij} x_j <= m$, wherein $r_{ij}$ is a constraint coefficient that represents a measure of resource consumption of resource i, for a crop identifier j, $x_j$ is a decision variable, and m is a maximum available amount of the resource.

* * * * *